April 27, 1926. 1,582,877
E. O. ELLIOTT
VALVE GEAR FOR LOCOMOTIVES
Filed March 25, 1925 4 Sheets-Sheet 3
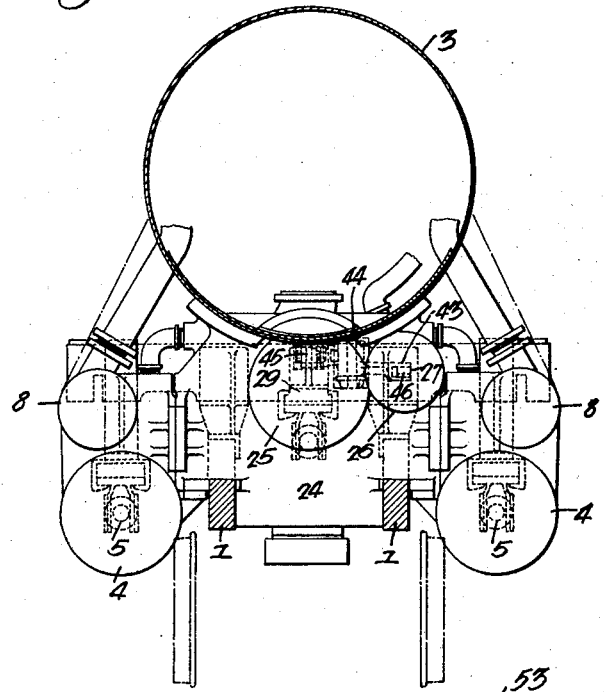
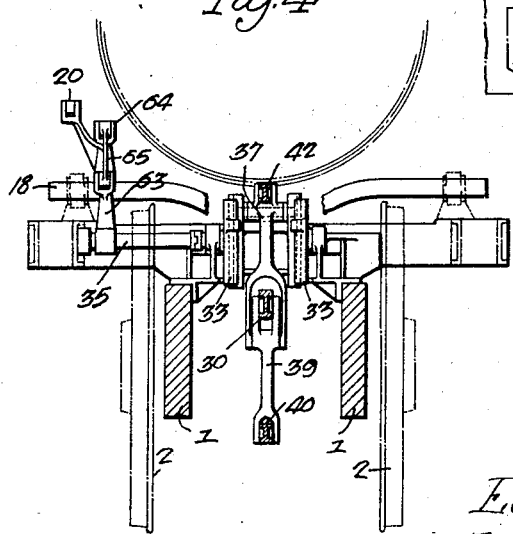
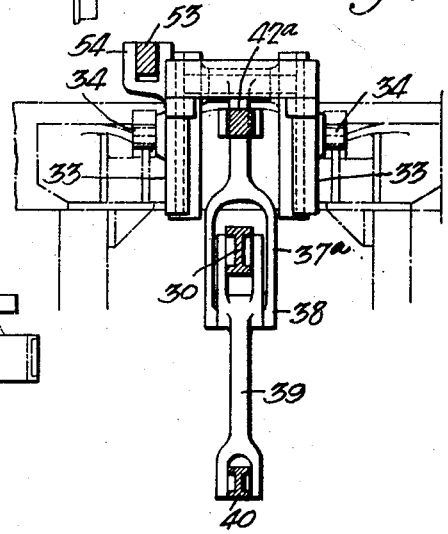
Inventor.-
Edward O. Elliott.
by his Attorneys.-
Howson + Howson.

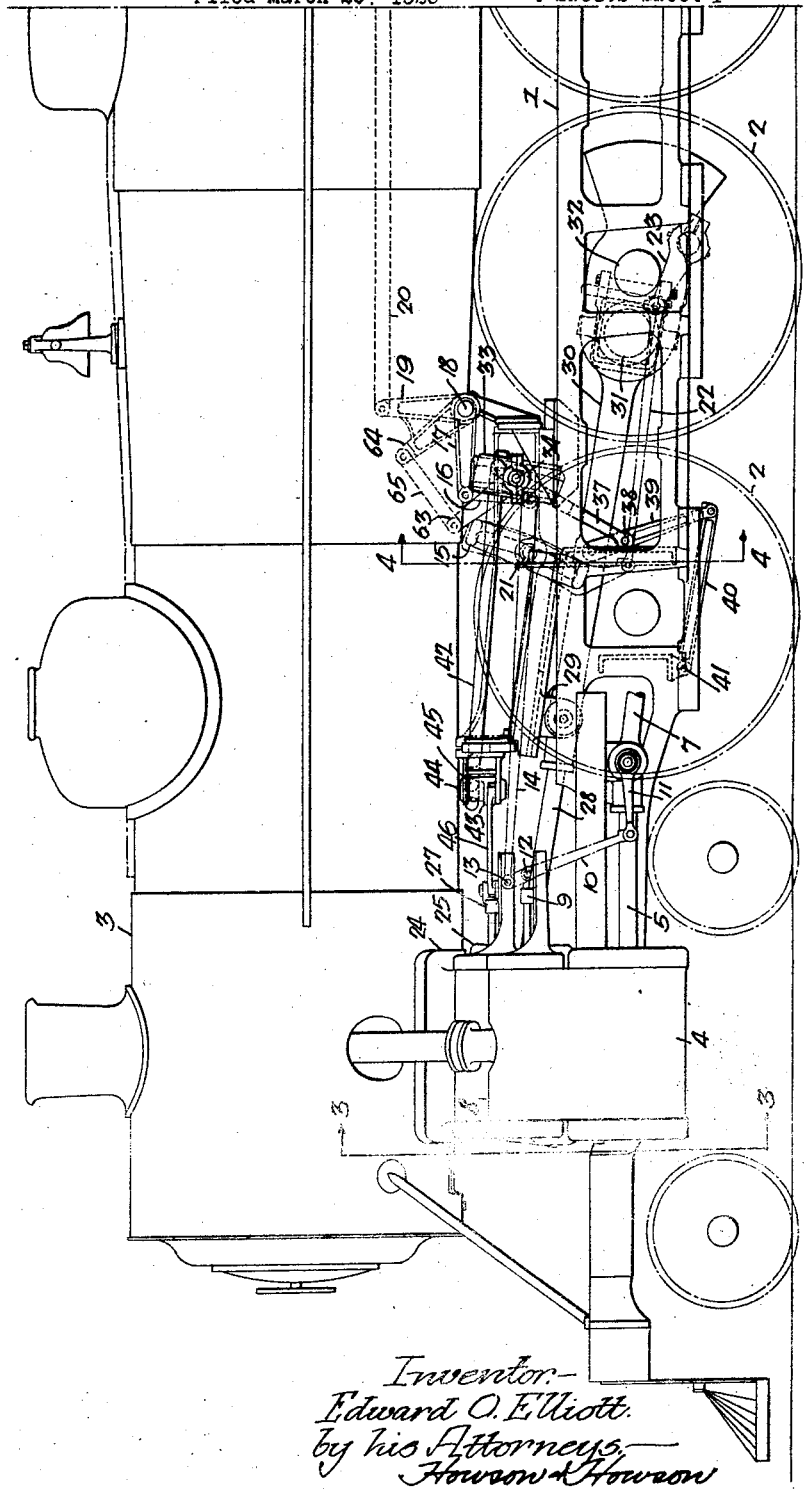

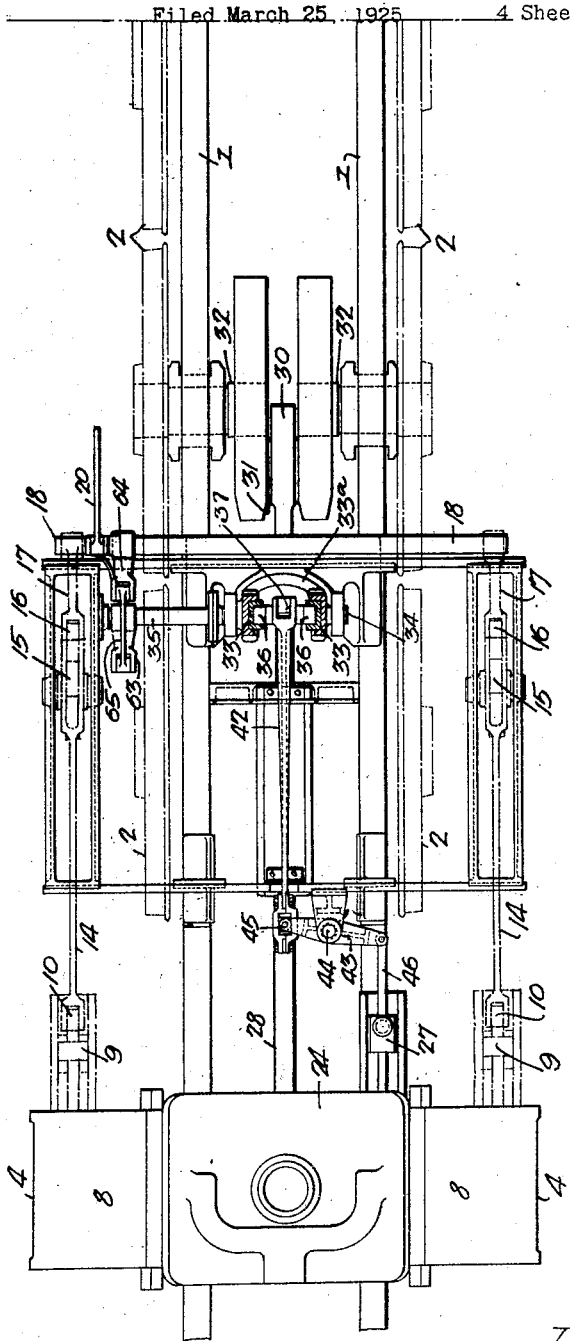

April 27, 1926.

E. O. ELLIOTT

VALVE GEAR FOR LOCOMOTIVES

Filed March 25, 1925 4 Sheets-Sheet 4

Inventor.
Edward O. Elliott.
by his Attorneys.
Howson & Howson

Patented Apr. 27, 1926.

1,582,877

UNITED STATES PATENT OFFICE.

EDWARD OAKLEY ELLIOTT, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

VALVE GEAR FOR LOCOMOTIVES.

Application filed March 25, 1925. Serial No. 18,175.

*To all whom it may concern:*

Be it known that I, EDWARD O. ELLIOTT, a citizen of the United States, residing in Philadelphia, Pennsylvania, have invented certain Improvements in Valve Gears for Locomotives, of which the following is a specification.

This invention relates to three cylinder locomotives and more particularly to the valve gears for the third cylinders of such locomotives.

The principal object of the invention is to provide a simple and efficient valve gear or linkage which is of an improved type and which is adapted for operating the valve of the third cylinder when this valve is located at one side of the center of the locomotive. Other objects will be apparent from the following specification and claims.

In the accompanying drawings I have shown two embodiments of the invention which have been selected for purposes of illustration, but it will be understood that various changes and substitutions may be made within the scope of the claims without departing from the spirit of the invention.

Of the drawings:

Fig. 1 is a left side view of a locomotive embodying one form of the invention.

Fig. 2 is a plan view, with the boiler structure removed, showing the valve gear as illustrated in Fig. 1.

Fig. 3 is a cross sectional view taken along the line 3—3 of Fig. 1.

Fig. 4 is a fragmentary transverse view, partly in section along the line 4—4 of Fig. 1.

Fig. 7 is a fragmentary transverse view of the construction shown in Figs. 5 and 6.

Figure 6:
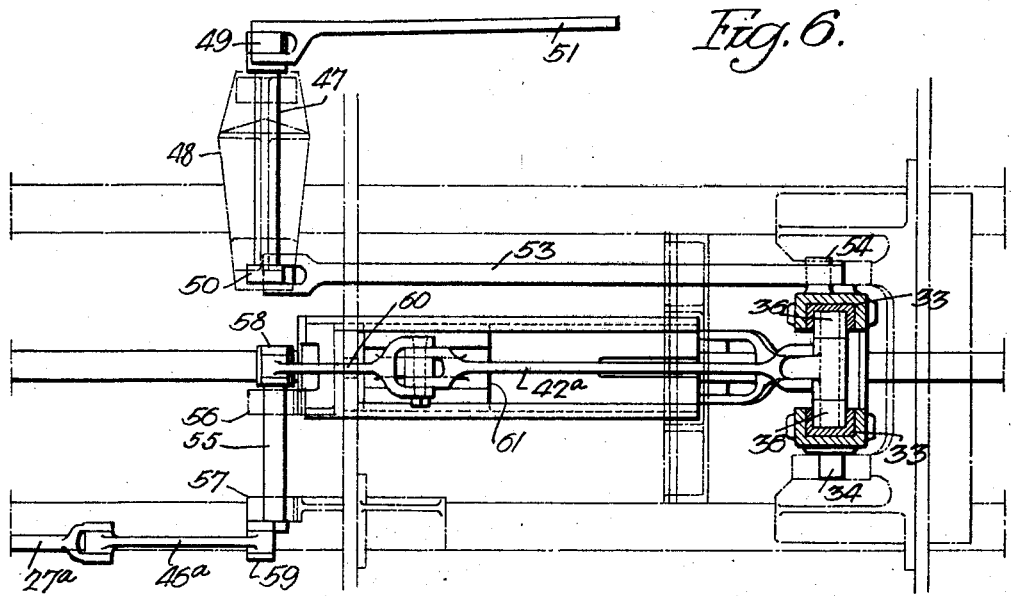
Fig. 6 is a diagrammatic fragmentary plan view of the parts shown in Fig. 5.

Referring to the drawings, particularly Figs. 1 to 3, 1 represents the main frame of a locomotive 2, 2 the driving wheels, and 3 the boiler structure. The locomotive is provided at its sides with the usual cylinders 4, 4 having pistons connected with piston rods 5 and connecting rods 7. The cylinders 4, 4 have the usual valve chests 8, 8 with valve yokes 9 for moving the valves.

A suitable valve gear or linkage is provided at each side of the locomotive for operating the corresponding valve yoke 9, and I have shown a gear of the Walschaert type. This includes a floating lap-and-lead rod 10 connected at its lower end with the cross head by means of a link 11. The lap-and-lead rod is pivotally connected between its ends at 12 to the valve yoke 9, and is pivotally connected at its upper end 13 to the forward end of a radius rod 14. The radius rod is pivotally connected between its ends with a block which is slidable in a segmental slot in a reverse link 15, and at its rear end the rod is connected with one end of a link 16. The other end of the link 16 is connected with a lever 17 on a transverse reverse shaft 18. A lever 19 is secured to the reverse shaft and is connected with a reach rod 20. Suitable means is provided for moving the reach rod, this means preferably being power actuated. By means of the reach rod and the other parts described the radius rod can be raised or lowered to move the aforesaid block to different positions in the segmental slot. The reverse link 15 is pivoted to the frame at 21 and at its lower end it is pivotally connected with an eccentric rod 22, which extends rearward to an eccentric crank arm 23 connected with one of the driving wheels.

From the foregoing description it will be apparent that the rod 10 when oscillated by the link 11 serves to reciprocate the valve yoke 9 to give the necessary lap-and-lead motion to the valve. This valve travel, however, is modified and controlled by the endwise motion which the radius rod 14 receives from the reverse link 15. When the radius rod is in its central or neutral position, as shown, it has no endwise motion. When the rod is raised or lowered, varying amounts of valve travel are obtained and the varying extent and different directions of this travel serve to regulate the flow of steam to the cylinders and also serve to reverse the direction of travel of the locomotive.

As thus far described the construction is old and well known and a wide range of equivalents may be used as preferred.

Preferably formed integrally with the saddle 24 is a third cylinder 25. The cylinder is located with its axis in or near the central longitudinal plane of the locomotive, and its valve chest 26 is located at one side of the said central plane, as clearly shown in Fig. 3. The cylinder is preferably inclined, but the valve chest is preferably, though not necessarily, horizontal. A valve yoke 27 is provided for moving the valve in the chest 26. A piston rod 28 is provided which is connected with cross head 29, and this in turn is connected with a centrally located connecting rod 30. The rear end of the rod 30 engages the central cranked portion 31 of the second main axle 32. The elevation and inclination of the third cylinder are such as to permit the connecting rod 30 to clear the front main axle.

For operating the valve yoke 27 a gear or linkage of the Joy type is provided, with certain modifications and improvements incorporated in accordance with my invention. As shown in Figs. 1 and 2, a reverse link 33 is pivoted to the frame midway between its ends. The link 33 is made up of two parts with a connector 33ª between the parts, and it is carried by a trunnion 34 and a shaft 35, the latter preferably being at the right hand side of the locomotive. The link has two opposed similar slots in the respective parts in which travel blocks 36, 36. Between these blocks is pivotally connected a combination lever 37. The lower end of the lever 37 is connected at 38 with an intermediate portion of a vibrating link 39. The upper end of the link 39 is pivotally connected with the connecting rod 30 and the lower end is pivotally connected with one end of a radius rod 40. The other end of the link 40 is pivoted at 41 to a cross tie attached to the main frame. The upper end of the lever 37 above the pivotal connection to the blocks 36, 36 is pivotally connected with the rear end of valve operating rod 42. The before mentioned slots in the link 33 are curved on a radius the same as the length of the rod 42. The reverse link 33 can be adjusted about its pivot by mechanism connected with the aforesaid reverse shaft 18. As shown there are levers 63 and 64 connected respectively with the reverse link 33 and the reverse shaft 18, and these are connected by a reach rod 65.

From the foregoing description it will be understood that the lever 37 is raised and lowered and also oscillated by reason of its connection with the connecting rod 30. With the reverse link 33 in its neutral position at right angles to the central position of the rod 42 the said rod receives very little endwise motion. However, it receives some such motion on account of the oscillatory movement of the combination lever 37, this being the motion necessary for the required lap-and-lead. When the reverse link 33 is adjusted to different angular positions the endwise motion of the rod 42 is increased and modified in the manner required for the control of the valve for the third cylinder.

The valve gear for the third cylinder, as thus far described, is of the conventional Joy type and does not of itself constitute a part of the invention. For a modern cylindrical piston valve with inside admission some modification must be made of the original Joy type of valve gear which was intended for valves with outside admission. For an inside admission valve, the gear is required to transmit motion to the valve oppositely to what was originally intended; and for a three cylinder locomotive with the valve chest for the third cylinder at one side of the center as herein described a further modification is necessary in order to transmit the motion from the center of the locomotive to a position at one side of the center. It is also advantageous in some cases to be able to give the valve an amount of movement differing slightly from that obtained by the linkage proper. These desired results may be obtained by different mechanisms embodying my invention and I have shown and will describe two such mechanisms. One of them is shown in Figs. 1 and 2 and the other in Figs. 4 and 5.

Referring first to Figs. 1 and 2, a lever 43 is mounted on the locomotive frame for oscillation about a vertical axis at 44 located between the ends of the lever. A universal joint 45 of any suitable construction is provided for connecting the inner end of the lever 43 with the rear end of rod 42. This universal joint accommodates not only the horizontal oscillations of the lever 43 but also the vertical oscillations of the rod 42. A link is pivotally connected at one end with the outer end of the lever 43, and at the other end with the valve yoke 27. The arms of the lever 43 preferably are of different lengths so that the extent of movement of the valve yoke 27 is slightly different from that of the rod 42. From the foregoing description it will be clear that the endwise motion of the rod 42 is transmitted to the valve yoke 27, but is reversed.

The construction as described is exceedingly simple and it accomplishes all of the desired results already described. The single lever 43 serves not only to reverse the main reciprocating motion transmitted by the reverse link 33, but also the lap-and-lead motion transmitted by the combination lever 37. The lever 43 also makes it possible for all of the parts at the front end of the linkage to be mounted entirely on the locomotive frame independently of the boiler, and the parts occupy a minimum of space in the vertical direction. Furthermore, a very simple and direct connection is provided from the reverse shaft 18 to the reverse lever 33 for the third cylinder, this being possible by reason of the fact that both of them move in the same direction.

Figure 5:
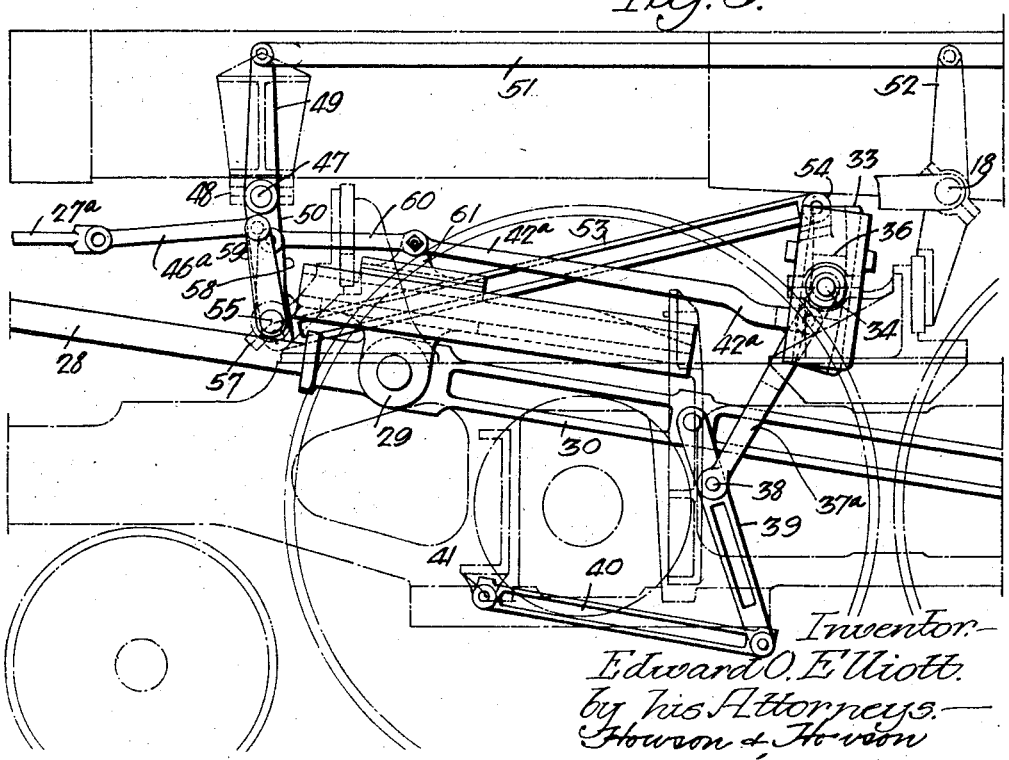
Fig. 5 is a diagrammatic fragmentary side view on an enlarged scale showing a modified form of invention.

The construction as described is ordinarily preferable, but in some cases it may be necessary to use a somewhat different construction, as shown in Figs. 4, 5 and 6, to secure the same results. Instead of providing a lever such as 43 for obtaining a reversed motion, connections are provided for reversing the movement of the reverse link 33 with respect to the reverse shaft 18. A short transverse rock shaft 47 is provided and is shown as mounted in a bearing bracket 48 secured to the boiler. Connected with the outer end of the shaft 47 is an upward extending lever 49, and connected with the inner end of the shaft is a downward extending lever 50. A link 51 connects the lever 49 with a lever 52 secured to the reverse shaft 18, and a link 53 connects the lever 50 with a lever 54 secured to the reverse link 33. By means of the construction described, the link 33 is moved simultaneously with the reverse shaft 18, but in opposite directions. The reverse link 33, therefore, serves to move the operating rod 42$^a$ in directions which are the reverse of those obtained by the mechanisms shown in Figs. 1 and 2.

It is also necessary to reverse the direction of the lap-and-lead movements. To this end a modified combination lever 37$^a$ is substituted for the lever 37. This is a lever of the second order instead a lever of the first order. The valve rod 42$^a$ is connected below the pivotal connection with the blocks 36, and it therefore receives movements in directions which are opposite to those received by the rod 42 in the other construction.

A second transverse shaft 55 is provided, this being mounted in bearings 56 and 57 connected with the main frame. This shaft carries two upward extending levers 58 and 59. The inner lever 58 is connected with the rod 42$^a$ and the outer lever 59 is connected to a link 46$^a$ which in turn is connected with the valve yoke 27$^a$. As shown the rod 42$^a$ is not connected directly with the lever 58, but indirectly through a link 60. The pivotal connection between the rod 42$^a$ and the link 60 is carried by a sliding cross-head 61. The link 60 and the cross-head 61 are provided in the case shown for structural reasons, and they may be omitted when structural conditions permit. The levers 58 and 59 preferably are of slightly different lengths, so that the extent of movement of the valve yoke 27$^a$ is slightly different from that of the rod 42$^a$.

The construction as described, while not as simple as that shown in Figs. 1 and 2, nevertheless serves to accomplish all of the desired results as already described.

What I claim is:

1. The combination with the cylinders and valve chests at the respective sides of a locomotive, of a third cylinder between the two side cylinders, a valve chest for the third cylinder located at one side thereof and at one side of the central vertical plane of the locomotive, a longitudinally movable valve yoke for the last said valve chest, valve gears at the sides of the locomotive for the first said valve chests, a valve gear for the third valve chest located between the first said gears and having its principal parts at or near the said central plane of the locomotive, and mechanism for transferring the resultant longitudinal motions of the last said gear from a line at or near the said central plane to the said valve yoke at one side of the said plane.

2. The combination with the cylinders and valve chests at the respective sides of a locomotive, of a third cylinder between the two side cylinders, a valve chest for the third cylinder located at one side thereof and at one side of the central vertical plane of the locomotive, a longitudinally movable valve yoke for the last said valve chest, valve gears at the sides of the locomotive for the first said valve chests, a valve gear for the third valve chest located between the first said gears and having its principal parts at or near the said central plane of the locomotive, and mechanism for transferring the resultant longitudinal motions of the last said gear from a line at or near the said central plane to the said valve yoke at one side of the said plane, the said mechanism also serving to change the extent of the said motions.

3. The combination with the cylinders and valve chests at the respective sides of a locomotive, of a centrally located third cylinder between the two side cylinders, a centrally located connecting rod associated with the third cylinder, a valve chest for the third cylinder located at one side thereof and at one side of the central vertical plane of the locomotive, a longitudinally movable valve yoke for the last said valve chest, valve gears at the sides of the locomotive for the first said valve chests, operating mechanism for the third valve yoke including a valve gear linkage of the Joy type, the said gear being actuated by the said connecting rod and having its principal parts at or near the said central plane of the locomotive, and means included in the said operating mechanism for reversing the directions of the longitudinal motions normally transmitted by a conventional Joy gear and for also transferring the said motions from a line at or near the said central plane to the said valve yoke at one side of the said plane.

4. The combination with the cylinders and valve chests at the respective sides of a locomotive, of a third cylinder between the two side cylinders, a valve chest for the third cylinder located at one side thereof and at one side of the central vertical plane of the locomotive, a longitudinally movable valve yoke for the last said valve chest, valve gears at the sides of the locomotive for the first said valve chests, a valve gear for the third valve chest located between the first said gears and having its principal parts at or near the said central plane of the locomotive, the said gear including a centrally located longitudinally extending rod through which the resultant motion is transmitted, and an approximately horizontal transverse lever having an approximately vertical fixed pivot between its ends, one end of the lever being pivotally connected with the last said rod and the other being connected with the said valve yoke.

5. The combination with the cylinders and valve chests at the respective sides of a locomotive, of a third cylinder between the two side cylinders, a valve chest for the third cylinder located at one side thereof and at one side of the central vertical plane of the locomotive, a longitudinally movable valve yoke for the last said valve chest, valve gears at the sides of the locomotive for the first said valve chests, a valve gear for the third valve chest located between the first said gears and having its principal parts at or near the said central plane of the locomotive, the said gear including a centrally located longitudinally extending rod through which the resultant motion is transmitted, an approximately horizontal transverse lever having an approximately vertical fixed pivot between its ends, a link for connecting one end of the lever with the valve yoke, and a universal joint for connecting the other end of the lever with the said centrally located rod.

6. The combination with the cylinders and valve chests at the respective sides of a locomotive, of a third cylinder between the two side cylinders, a valve chest for the third cylinder located at one side thereof and at one side of the central vertical plane of the locomotive, a longitudinally movable valve yoke for the last said valve chest, valve gears at the sides of the locomotive for the first said valve chests, a valve gear for the third valve chest located between the first said gear and having its principal parts at or near the said central plane of the locomotive, the said gear including a centrally located longitudinally extending rod through which the resultant motion is transmitted, and an approximately horizontal transverse lever having an approximately vertical fixed pivot between its ends and at unequal distances therefrom, one end of the lever being pivotally connected with the last said rod and the other being connected with the said valve yoke.

EDWARD OAKLEY ELLIOTT.